(12) United States Patent
Kanai (10) Patent No.: US 6,838,659 B2
(45) Date of Patent: Jan. 4, 2005

(54) PHOTODETECTOR, PHOTODETECTING METHOD AND STORAGE MEDIUM FOR MEASURING A LUMINANCE CHARACTERISTIC OF A SPECIFIC COLOR

(75) Inventor: Masashi Kanai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 29 days.

(21) Appl. No.: 10/348,989

(22) Filed: Jan. 23, 2003

(65) Prior Publication Data

US 2003/0169341 A1 Sep. 11, 2003

(30) Foreign Application Priority Data

Feb. 5, 2002 (JP) .......................................... 2002-028407

(51) Int. Cl.⁷ ............................ H01J 40/14; H01J 5/16
(52) U.S. Cl. ...................... 250/226; 356/402; 348/744
(58) Field of Search ................. 250/226; 356/402–425; 348/602, 744, 189

(56) References Cited

U.S. PATENT DOCUMENTS

| | | | | |
|---|---|---|---|---|
| 5,459,678 | A | * 10/1995 | Feasey | ........................ 358/518 |
| 6,362,849 | B1 | 3/2002 | Caisey-Bluteau et al. | |
| 6,373,531 | B1 | * 4/2002 | Hidaka et al. | ............... 348/603 |
| 6,606,116 | B1 | * 8/2003 | Poynter | ........................ 348/189 |

FOREIGN PATENT DOCUMENTS

| | | | |
|---|---|---|---|
| JP | A 10-65930 | 3/1998 |
| JP | A 11-509931 | 8/1999 |
| JP | A 2000-46648 | 2/2000 |
| JP | A 2000-152269 | 5/2000 |
| JP | A 2001-36758 | 2/2001 |
| JP | A 2001-186540 | 7/2001 |
| JP | A 2001-320725 | 11/2001 |

* cited by examiner

Primary Examiner—Stephone B. Allen
Assistant Examiner—Patrick J. Lee
(74) Attorney, Agent, or Firm—Oliff & Berridge, PLC

(57) ABSTRACT

A photodetector capable of making a more accurate measurement, a photodetecting method, a program, and a storage medium, are to be provided.

The photodetector according to the present invention measures a luminance characteristic of a specific color outputted from a display unit under a specific illumination light. According to the photodetector of the present invention, color components of the illumination light and color components of the specific light are separated from each other by means of a light separator 60f. Then, using an operator Md for the display unit, the color components of the specific color thus separated are converted from LMS to XYZ by means of a converter 60g for the display unit. Further, using an operator Mi for illumination, the color components of the illumination light thus separated are converted from LMS to XYZ by means of a converter 60h for illumination. Thus, since the operator for the display unit and the operator for illumination are used each independently for the conversion from RGB to LMS, even a stacked color of both display unit output and illumination light can be measured with a higher accuracy.

15 Claims, 7 Drawing Sheets

PHOTODETECTOR, PHOTODETECTING METHOD AND STORAGE MEDIUM FOR MEASURING A LUMINANCE CHARACTERISTIC OF A SPECIFIC COLOR

BACKGROUND OF INVENTION

1. Field of Invention

The present invention relates to a photodetector and more particularly to a photodetector capable of making a measurement with a higher accuracy, a photodetecting method, a program, and a storage medium.

2. Description of the Related Art

In case of using an image display unit such as a projector, it is important that an image intended by a producer can be reproduced even if the application environment changes. As a way of thinking for adjusting the appearance of such an image, there is a way of thinking called color management in which input/output characteristcs of a device are managed to reproduce colors. Thus, for effecting an appropriate color reproduction, it is necessary to take into account a change of the application environment (e.g., a change in brightness and color of an external illumination) detected with use of a photosensor.

In case of providing a photosensor in a projector to obtain information of the application environment, an increase in cost of the entire projector is to be avoided and therefore it is impossible to use a so expensive photosensor. As the photosensor there is used, for example, a three-channel photosensor comprising a photodiode and RGB filters superimposed thereon. In this case, it is necessary to convert RGB outputs from the photosensor into tri-stimulus values XYZ. According to a method so far adopted generally, RGB outputs from a projector are measured using the foregoing photosensor and a highly accurate luminance meter, then a 3×3 matrix for conversion is obtained from the resulting correlation, and there is performed conversion from RGB to XYZ using the said matrix.

According to the above method, however, a spectral distribution of illumination is different from that of the projector, although with respect to the projector output there can be made conversion from RGB to XYZ with a high accuracy. As to illumination, therefore, it is difficult to effect a highly accurate conversion from RGB to XYZ even with use of the same matrix as the foregoing matrix.

SUMMARY OF INVENTION

The present invention has been accomplished for solving the above-mentioned problem and it is an object of the invention to provide a photodetector capable of making a more accurate measurement, a photodetecting method, a program, and a storage medium.

According to one aspect of the present invention, a photodetector for measuring a luminance characteristic of a specific color outputted from a display unit, under a specific illumination light, includes: a light separating unit for separating color components of the illumination light and color components of the specific color from each other; a conversion unit for the display unit, which converts an output of the photodetector for the separated color components of the specific color into device-independent coordinate values, using an operator for the display unit; and a conversion unit for illumination, which converts an output of the photodetector for the separated color components of the illumination light into device-independent coordinate values, using an operator for illumination.

According to the thus constructed photodetector for measuring a luminance characteristic of a specific color outputted from a display unit, under a specific illumination light, color components of the illumination light and color components of the specific color are separated by a light separating unit from each other. Therefore, by a conversion unit for the display unit, an output of the photodetector for the separated color components of the specific color is converted into device-independent coordinate values, using an operator for the display unit. And, by a conversion unit for illumination, an output of the photodetector for the separated color components of the illumination light is converted into device-independent coordinate values, using an operator for illumination. Thus, since the operator for the display unit and the operator for illumination are used each independently for the conversion from LMS to XYZ, even a stacked color of both display unit output and illumination light can be measured with a higher accuracy.

According to the present invention, the light separating unit may separate the color components of the illumination light and the color components of the specific color from each other by subtracting a luminance characteristic obtained when the display unit outputs black, from a luminance characteristic of the specific color outputted by the display unit.

According to the present invention, the operator for the display unit may be a matrix obtained from a correlation obtained by measuring an output of the photodetector and device-independent coordinate values when the display unit outputs RGB.

According to the present invention, the operator for illumination may be a matrix obtained from a correlation obtained by measuring outputs of the photodetector for a plurality of illumination lights and device-independent coordinate values and a correlation obtained by measuring an output of the photodetector and device-independent coordinate values when the display unit outputs black.

According to the present invention, the device-independent coordinate values converted by the conversion unit for the display unit and the device-independent coordinate values converted by the conversion unit for illumination may be added together.

According to the present invention, the device-independent coordinate values may be XYZ.

According to another aspect of the present invention, a photodetecting method for measuring a luminance characteristic of a specific color outputted from a display unit, under a specific illumination light, includes: a light separating step for separating color components of the illumination light and color components of the specific color from each other; a conversion step for the display unit, which converts an output of the photodetector for the separated color components of the specific color into device-independent coordinate values, using an operator for the display unit; and a conversion step for illumination, which converts an output of the photodetector for the separated color components of the illumination light into device-independent coordinate values, using an operator for illumination.

Another aspect of the present invention, is a program of instructions for execution by the computer to perform a photodetecting processing for measuring a luminance characteristic of a specific color outputted from a display unit, under a specific illumination light, the photodetecting processing including: a light separating processing for separating color components of the illumination light and color components of the specific color from each other; a conversion processing for the display unit, which converts an output of the photodetector for the separated color components of the specific color into device-independent coordinate values, using an operator for the display unit; and a conversion processing for illumination, which converts an output of the photodetector for the separated color components of the illumination light into device-independent coordinate values, using an operator for illumination.

Another aspect of the present invention, is a computer-readable medium having a program of instructions for execution by the computer to perform a photodetecting processing for measuring a luminance characteristic of a specific color outputted from a display unit, under a specific illumination light, the photodetecting processing including: a light separating processing for separating color components of the illumination light and color components of the specific color from each other; a conversion processing for the display unit, which converts an output of the photodetector for the separated color components of the specific color into device-independent coordinate values, using an operator for the display unit; and a conversion processing for illumination, which converts an output of the photodetector for the separated color components of the illumination light into device-independent coordinate values, using an operator for illumination.

DESCRIPTION OF THE PREFERRED EMBODIMENT

A preferred embodiment of the present invention will be described hereinunder with reference to the accompanying drawings.

System Configuration

Figure 1:
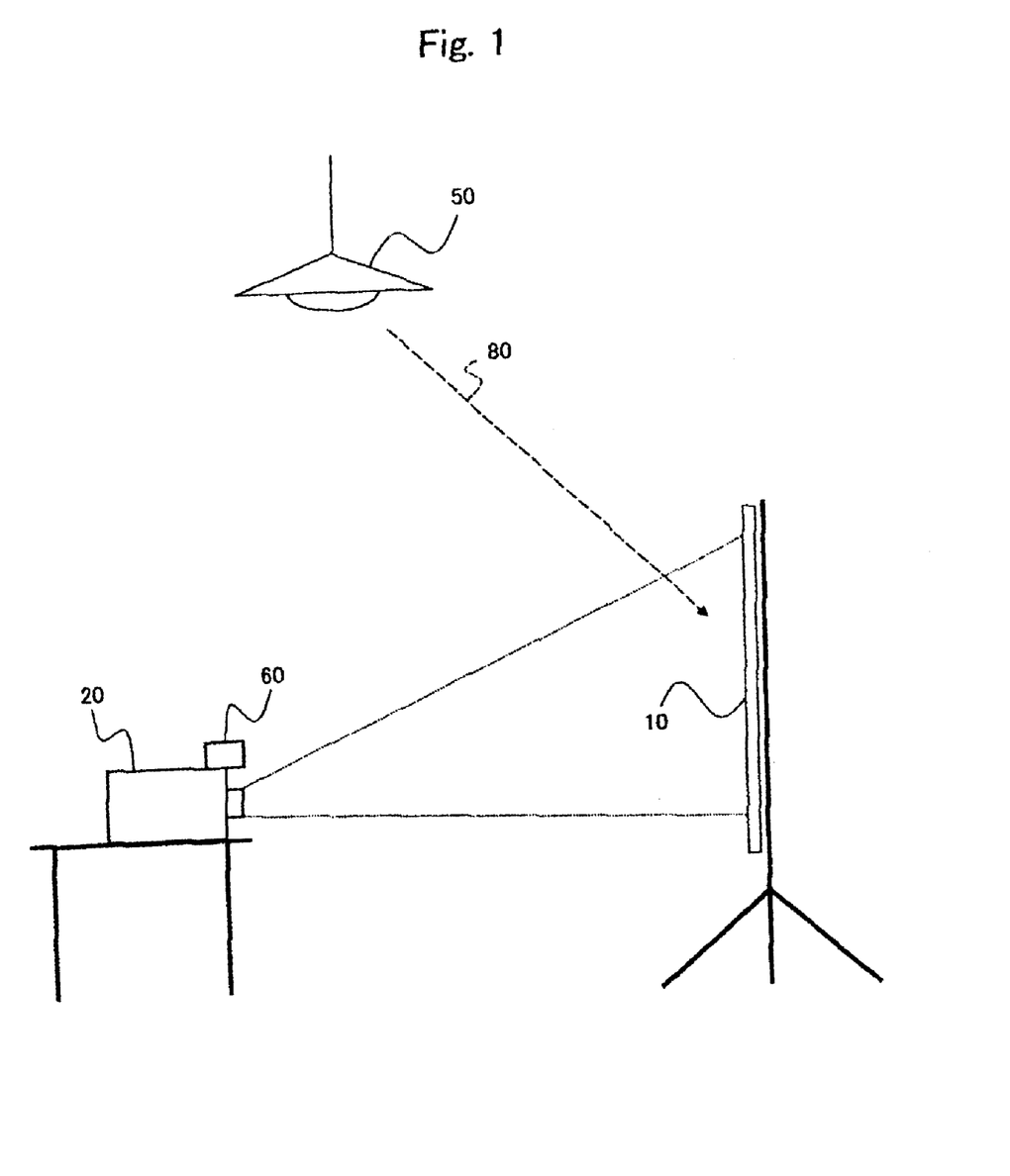
FIG. 1 is a schematic explanatory diagram of a system using a projector 20 in an embodiment of the present invention.

FIG. 1 is a schematic explanatory diagram of a system using a projector 20 which is provided with a photosensor 60 as a photodetector according to an embodiment of the present invention.

A predetermined image is projected from the projector 20 which is disposed nearly in front of a screen 10. In this case, how the image projected on the screen 10 is looked differs greatly depending on an external illumination 80 emitted from a lighting device 50. For example, even where the same white is displayed, the white may seen as a bright white or a dark white depending on the intensity of the external illumination 80.

Figure 2:
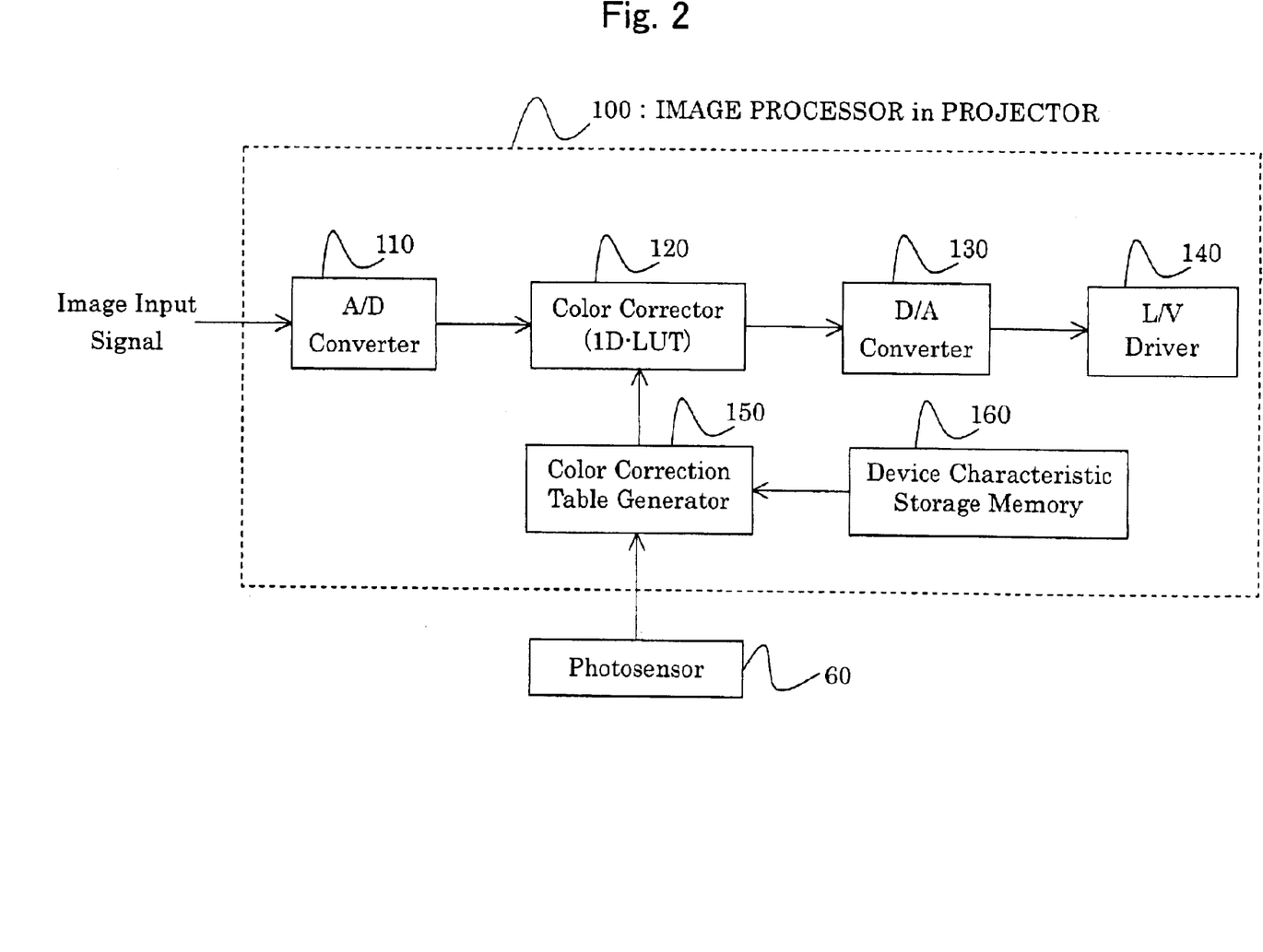
FIG. 2 is a functional block diagram of an image processor disposed within the projector 20 which is provided in a photosensor 60 according to an embodiment of the present invention.

FIG. 2 is a functional block diagram of an image processor 100 disposed within the projector 20 which is provided with the photosensor 60 according to this embodiment.

The image processor 100 disposed within the projector 20 in FIG. 2 is provided with an A/D converter 110 for converting an image input signal of an analog form into a digital signal, a color corrector 120 which performs a desired color correction by applying a one-dimensional color correction table to RGB image input signals, a D/A converter 130 for converting a digital signal to an analog signal, a L/V (light valve) driver 140 for driving a liquid crystal light valve to perform a projection display of image, a device characteristic storage memory 160 for storing device (projector) characteristics, and a color correction table generator 150. When the photosensor 60 measures the luminance of screen-reflected light of the projector and external illumination, the color correction table generator 150 generates a color correction table taking the influence of external illumination into account on the basis of the device characteristics stored in the device characteristic storage memory 160 and the values measured by the photosensor 60.

Configuration of Photosensor 60

Next, with reference to FIG. 3, the configuration of the photosensor 60 according to an embodiment of the present invention will be described hereinafter.

Figure 3:
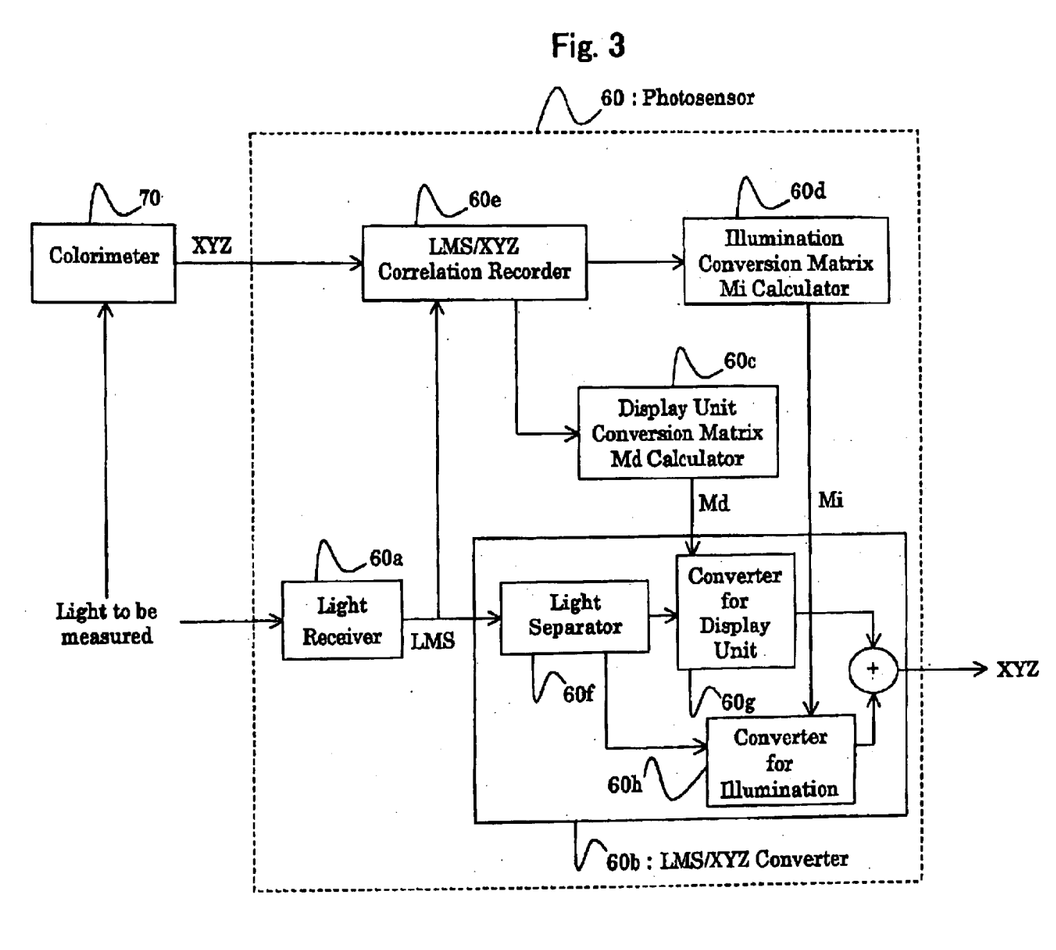
FIG. 3 is a functional block diagram of the photosensor 60 according to an embodiment of the present invention.

The photosensor 60 shown in FIG. 3 is provided with: a light receiver 60a adapted to receive the light to-be-measured through a photosensor comprising three types of stacked filters and then output corresponding three types of values, which is referred to as "LMS values" hereinafter, an LMS/XYZ correlation recorder 60e adapted to record a correlation between LMS values measured by the light receiver 60a and XYZ values (device-independent coordinate values) measured by a colorimeter 70 with respect to the same light to be measured, a conversion matrix Md calculator 60c for the display unit which calculator 60c calculates a conversion matrix Md for the display unit on the basis of the LMS-XYZ correlation recorded in the LMS/XYZ correlation recorder 60e, a conversion matrix Mi calculator 60d for illumination which calculator 60d calculates a conversion matrix Mi for illumination on the basis of the LMS-XYZ correlation recorded in the LMS/XYZ correlation recorder 60e, and an LMS/XYZ converter 60b which converts LMS values outputted from the light receiver 60a into XYZ values by reference to the conversion matrix Md for the display unit and the conversion matrix Mi for illumination. Furthermore, the LMS/XYZ converter 60b is provided with a light separator 60f, a converter 60g for the display unit, and a converter 60h for illumination.

Photodetection Processing by Photosensor 60

Figure 4:
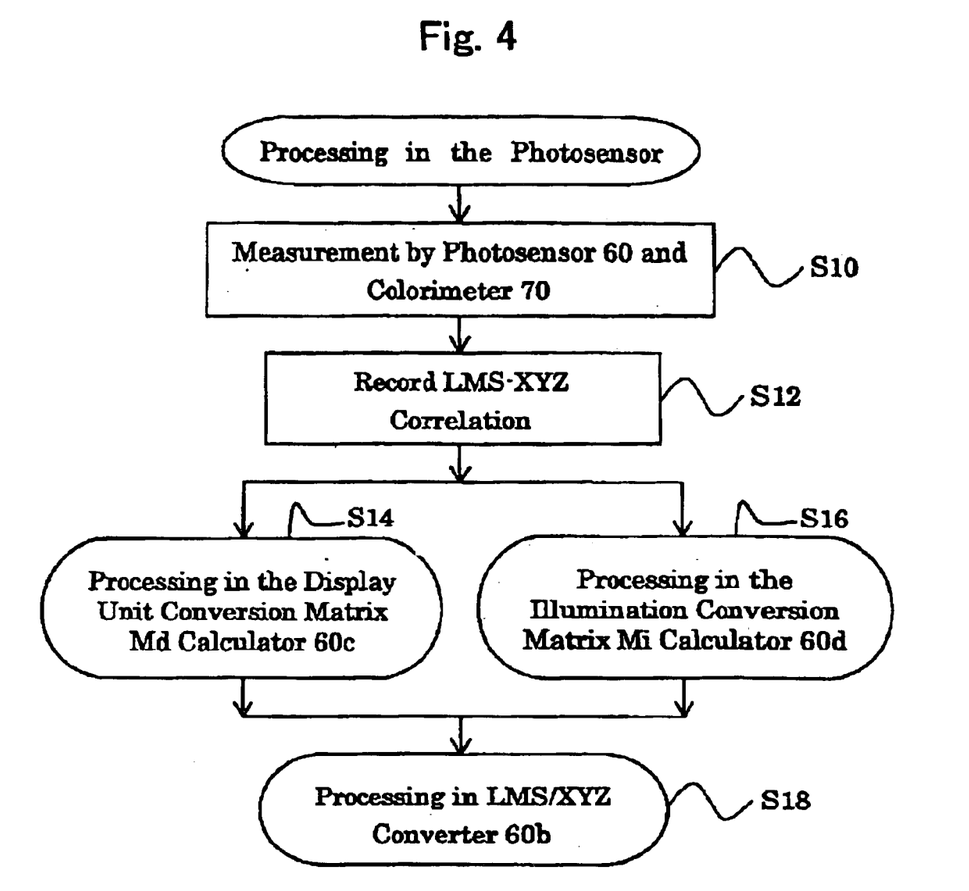
FIG. 4 is a flow chart for explaining a processing carried out in the photosensor 60 according to an embodiment of the present invention.

Referring now to FIG. 4, a description will be given about the processing which is carried out by the photosensor 60 according to this embodiment. The processing to be described below is carried out by executing a program stored in a program storage unit (not shown) of the photosensor 60. The program storage unit constitutes a medium which stores the program. This processing program itself is included in the scope of the present invention.

As shown in FIG. 4, first with respect to R (red), G (green), B (blue), and K (black) on the display unit (projector) and typical several types (at least two types) of illuminations, LMS values are measured by the photosensor 60 for the objects and XYZ values are measured by the colorimeter 70 which can measure tri-stimulus values (S10). As examples of typical illuminations are mentioned incandescent light, white fluorescent light, daylight fluorescent light, and daylight. Correlations of these illuminations are recorded in the LMS/XYZ correlation recorder 60e (S12). Table 1 below shows an example of correlations recorded in the LMS/XYZ correlation recorder 60e.

TABLE 1

| Light to be measured | Measured values by Sensor | Measured values by Luminance Meter |
|---|---|---|
| R (Red) in display unit | $L_R M_R S_R$ | $X_R Y_R Z_R$ |
| G (Green) in display unit | $L_G M_G S_G$ | $X_G Y_G Z_G$ |
| B (Blue) in display unit | $L_B M_B S_B$ | $X_B Y_B Z_B$ |
| K (Black) in display unit | $L_K M_K S_K$ | $X_K Y_K Z_K$ |
| Illumination 1 | $L_1 M_1 S_1$ | $X_1 Y_1 Z_1$ |
| Illumination 2 | $L_2 M_2 S_2$ | $X_2 Y_2 Z_2$ |
| ⋮ | ⋮ | ⋮ |

After the processing in the display unit conversion matrix Md calculator 60c (S14) and the processing in the illumination conversion matrix Mi calculator 60d (S16) have been carried out on the basis of such correlations as shown in Table 1, there is performed processing in the LMS/XYZ converter 60b (S18). The processings in steps S14, S16, and S18 will be described below in detail.

(1) Processing in Display Unit Conversion Matrix Md Calculator 60c

Figure 5:
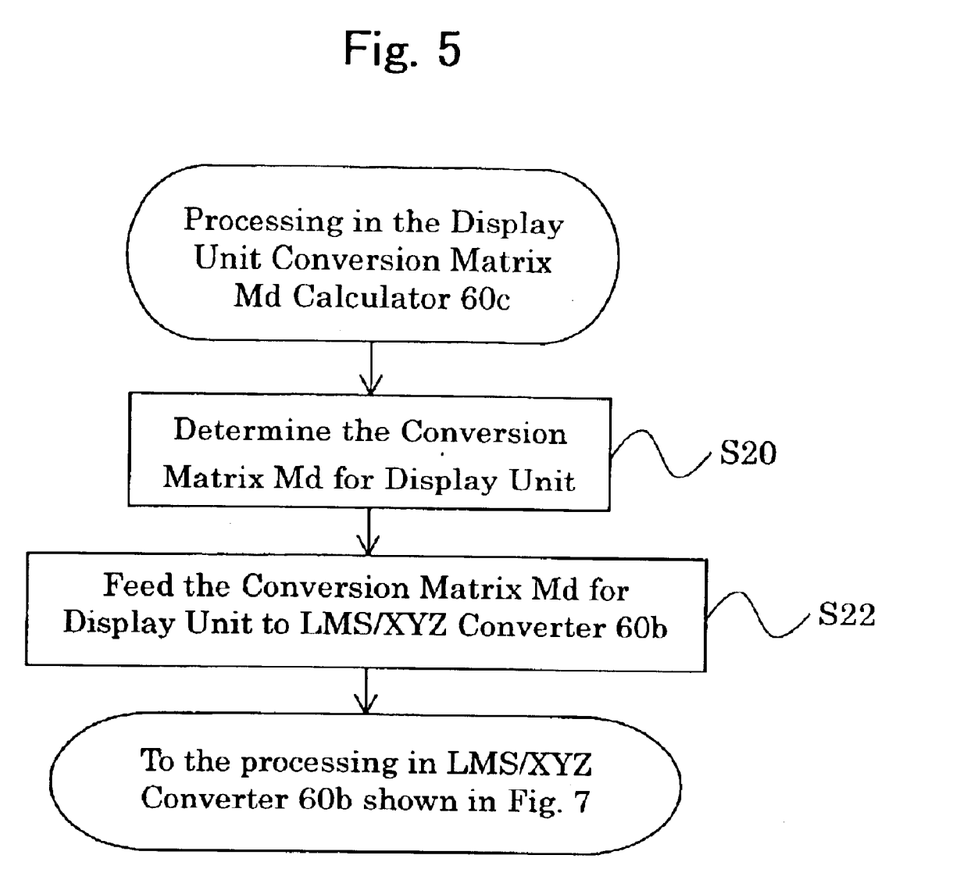
FIG. 5 is a flow chart for explaining a processing carried out in a display unit conversion matrix Md calculator 60c in the photosensor 60 according to an embodiment of the present invention.

FIG. 5 is a flow chart for explaining the processing carried out in the display unit conversion matrix Md calculator 60c in the photosensor 60 according to an embodiment of the present invention.

As shown in FIG. 5, the calculator 60c first determines the conversion matrix Md for the display unit (S20), which matrix Md is defined as follows:

[Expression 1]

$$\begin{pmatrix} X_i - X_K \\ Y_i - Y_K \\ Z_i - Z_K \end{pmatrix} = Md \begin{pmatrix} L_i - L_K \\ M_i - M_K \\ S_i - S_K \end{pmatrix} \quad (i = R, G, B) \quad (1)$$

This expression can be written as follows in accordance with the correlations of sensor measured values and luminance meter measured values on RGBK in the display unit, which are shown in Table 1:

[Expression 2]  (2)

$$\begin{pmatrix} X_R - X_K & X_G - X_K & X_B - X_K \\ Y_R - Y_K & Y_G - Y_K & Y_B - Y_K \\ Z_R - Z_K & Z_G - Z_K & Z_B - Z_K \end{pmatrix} =$$

$$Md \begin{pmatrix} L_R - L_K & L_G - L_K & L_B - L_K \\ M_R - M_K & M_G - M_K & M_B - M_K \\ S_R - S_K & S_G - S_K & S_B - S_K \end{pmatrix}$$

From the expression (2), the display unit conversion matrix Md (operator for the display unit) is determined as follows:

[Expression 3]  (3)

$$Md = \begin{pmatrix} X_R - X_K & X_G - X_K & X_B - X_K \\ Y_R - Y_K & Y_G - Y_K & Y_B - Y_K \\ Z_R - Z_K & Z_G - Z_K & Z_B - Z_K \end{pmatrix}$$

$$\begin{pmatrix} L_R - L_K & L_G - L_K & L_B - L_K \\ M_R - M_K & M_G - M_K & M_B - M_K \\ S_R - S_K & S_G - S_K & S_B - S_K \end{pmatrix}^{-1}$$

Figure 7:
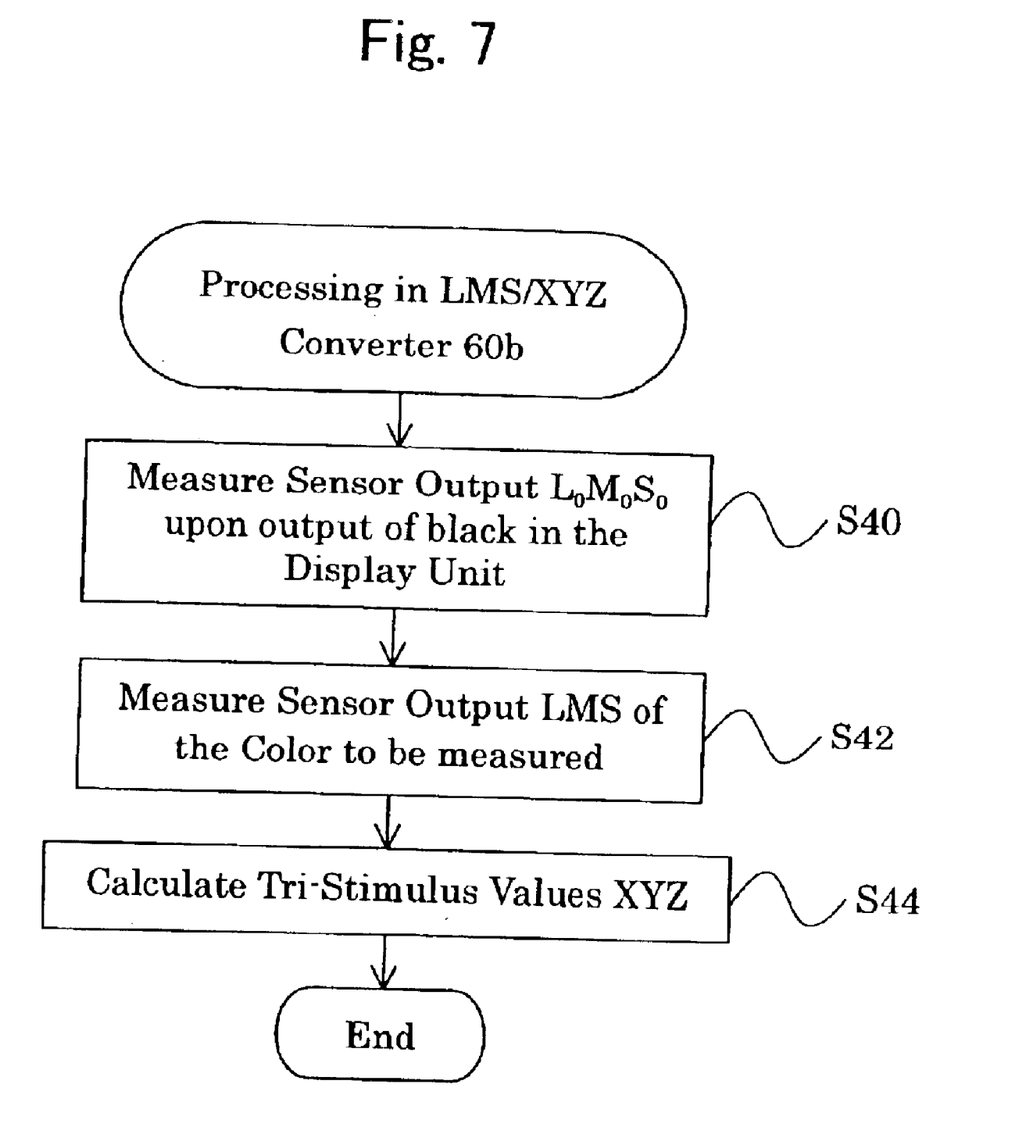
FIG. 7 is a flow chart for explaining a processing carried out in an LMS/XYZ converter 60b in the photosensor 60 according to an embodiment of the present invention.

The display unit conversion matrix Md thus determined is fed to the LMS/XYZ converter 60b (S22) and a shift is made to the processing in LMS/XYZ converter 60b shown in FIG. 7.

(2) Illumination Conversion Matrix Mi Calculator 60d

Figure 6:
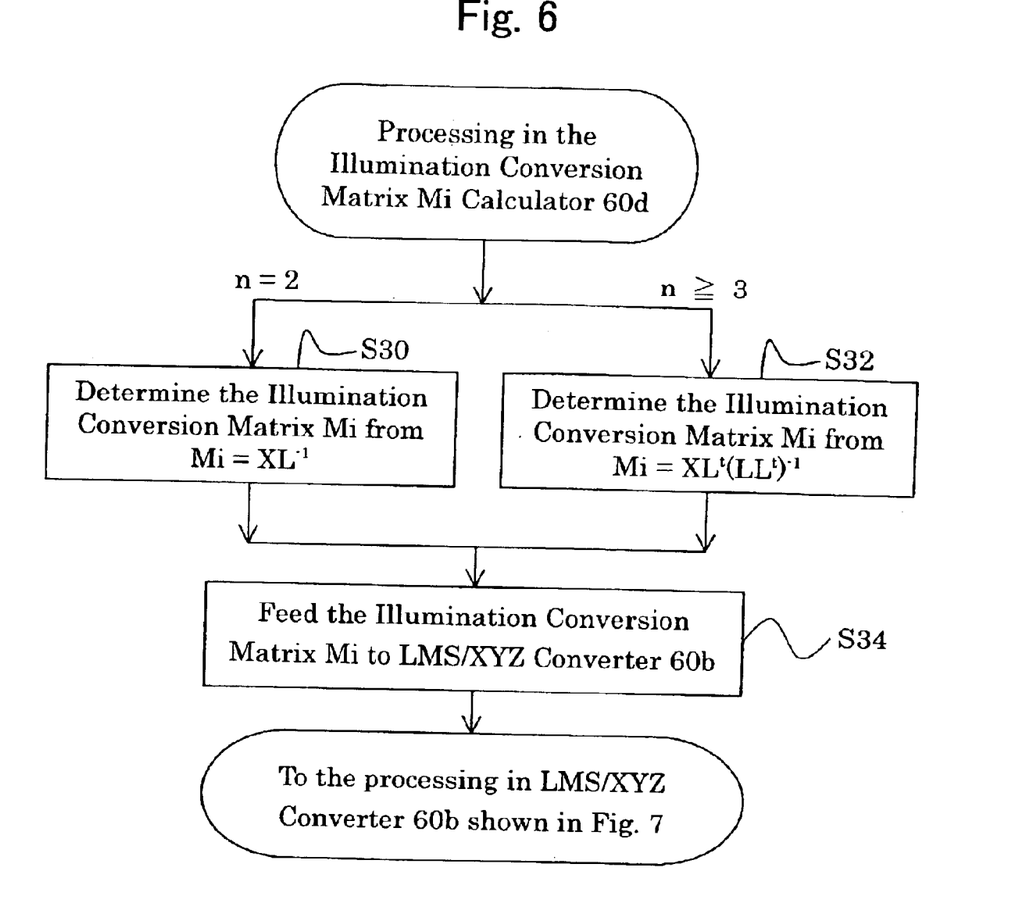
FIG. 6 is a flow chart for explaining a processing carried out in an illumination conversion matrix Mi calculator 60d in the photosensor 60 according to an embodiment of the present invention.

FIG. 6 is a flow chart for explaining the processing carried out in the illumination conversion matrix Mi calculator 60d in the photosensor 60 according to an embodiment of the present invention.

As shown in FIG. 6, the illumination conversion matrix Mi calculator 60d first determines the illumination conversion matrix Mi (operator for illumination) (S30 or S32).

With n=2, that is, when there are two types of illuminations to be measured, the illumination conversion matrix Mi is determined from:

$Mi = XL^{-1}$  [Expression 4]

(S30), while with n≧3, that is, when there are three or more types of illuminations to be measured, the illumination conversion matrix Mi is determined from:

$Mi = XL^t(LL^t)^{-1}$  [Expression 5]

(S32). In the above expression:

[Expression 6]

$$X = \begin{pmatrix} X_K & X_1 & \ldots & X_n \\ Y_K & Y_1 & \ldots & Y_n \\ Z_K & Z_1 & \ldots & Z_n \end{pmatrix}$$

$$L = \begin{pmatrix} L_K & L_1 & \ldots & L_n \\ M_K & M_1 & \ldots & M_n \\ S_K & S_1 & \ldots & S_n \end{pmatrix}$$

and n stands for the number of illumination.

The illumination conversion matrix Mi thus determined is fed to the LMS/XYZ converter 60b (S34) and a shift is made to the processing in LMS/XYZ converter 60b shown in FIG. 7.

(3) Processing in LMS/XYZ Converter 60b

FIG. 7 is a flow chart for explaining the processing in LMX/XYZ converter 60b in the photosensor 60 according to an embodiment of the present invention.

As shown in FIG. 7, the light separator 60f in the LMS/XYZ converter 60b first measures sensor output values $L_0 M_0 S_0$ when the display unit outputs K (black) (S40) and also measures sensor output values LMS of a color (specific color) to be measured (S42). The sensor output values $L_0 M_0 S_0$ upon output of K (black) in the display unit are considered to be the sum of the output of black in the display unit and illumination light, so the components of the aforesaid specific color become ($L-L_0$, $M-M_0$, $S-S_0$). In this way the color components of the specific color are separated.

Next, using the matrix Md obtained by the display unit conversion matrix Md calculator 60c, the converter 60g for the display unit converts ($L-L_0$, $M-M_0$, $S-S_0$) into XYZ values, while the converter 60h for illumination converts ($L_0$, $M_0$, $S_0$) into XYZ values, using the matrix Mi obtained by the illumination conversion matrix Mi calculator 60d. Then, the XYZ values obtained by the converter 60g for the display unit and the XYZ values obtained by the converter 60h for illumination are added together to determine tri-stimulus values XYZ of the color being measured. That is, tri-stimulus values XYZ of the color being measured are determined in accordance with the following expression (S44):

[Expression 7]

$$\begin{pmatrix} X \\ Y \\ Z \end{pmatrix} = Md \begin{pmatrix} L-L_0 \\ M-M_0 \\ S-S_0 \end{pmatrix} + Mi \begin{pmatrix} L_0 \\ M_0 \\ S_0 \end{pmatrix}$$

Thus, if photodetection is performed by means of the photosensor 60 according to an embodiment of the present invention, since there is made conversion from LMS to XYZ with use of both display unit conversion matrix Md and illumination conversion matrix Mi, even a stacked color of both projector output and illumination light can be measured with a higher accuracy.

What is claimed is:

1. A photodetector for measuring a luminance characteristic of a specific color outputted from a display unit, under a specific illumination light, comprising:

a light separating unit for separating color components of said illumination light from color components of said specific color;

a conversion unit for the display unit, which converts an output of said photodetector for said separated color components of the specific color into display unit-independent coordinate values, using an operator for the display unit; and a conversion unit for illumination, which converts an output of said photodetector for said separated color components of the illumination light into display unit-independent coordinate values, using an operator for illumination.

2. The photodetector according to claim 1, wherein said light separating unit separates the color components of said illumination light and the color components of said specific color from each other by subtracting a luminance characteristic obtained when the display unit outputs black, from a luminance characteristic of the specific color outputted by the display unit.

3. The photodetector according to claim 1, wherein said operator for the display unit is a matrix obtained from a correlation obtained by measuring an output of said photodetector and device-independent coordinate values when the display unit outputs RGB.

4. The photodetector according to claim 1, wherein said operator for illumination is a matrix obtained from a correlation obtained by measuring outputs of said photodetector for a plurality of illumination lights and device-independent coordinate values and a correlation obtained by measuring an output of the photodetector and device-independent coordinate values when said display unit outputs black.

5. The photodetector according to claim 1, wherein the device-independent coordinate values converted by said conversion unit for the display unit and the device-independent coordinate values converted by said conversion unit for illumination are added together.

6. The photodetector according to claim 1, wherein said device-independent coordinate values are XYZ.

7. A projector comprising the photodetector according to claim 1.

8. A photodetecting method for measuring a luminance characteristic of a specific color outputted from a display unit, under a specific illumination light, comprising:

a light separating step for separating color components of said illumination light from color components of said specific color;

a conversion step for the display unit, which converts an output of a photodetector for said separated color components of the specific color into display unit-independent coordinate values, using an operator for the display unit; and a conversion step for illumination, which converts an output of said photodetector for said separated color components of the illumination light into display unit-independent coordinate values, using an operator for illumination.

9. A computer-readable medium having a program of instructions for execution by the computer to perform a photodetecting processing for measuring a luminance characteristic of a specific color outputted from a display unit, under a specific illumination light, said photodetecting processing comprising:

a light separating processing for separating color components of said illumination light from color components of said specific color;

a conversion processing for the display unit, which converts an output of a photodetector for said separated color components of the specific color into display unit-independent coordinate values, using an operator for the display unit; and a conversion processing for illumination, which converts an output of said photodetector for said separated color components of the illumination light into display unit-independent coordinate values, using an operator for illumination.

10. The photodetecting method according to claim 8, wherein said operator for illumination is a matrix obtained from a correlation obtained by measuring outputs of a said photodetector for a plurality of illumination lights and display unit-independent coordinate values and a correlation obtained by measuring an output of the photodetector and display unit-independent coordinate values when said display unit outputs black.

11. The photodetecting method according to claim 8, wherein the display unit-independent coordinate values converted by said conversion step for the display unit and the display unit-independent coordinate values converted by said conversion step for illumination are added together.

12. The photodetecting method according to claim 8, wherein said display unit-independent coordinate values are XYZ.

13. The computer-readable medium according to claim 9, wherein said operator for illumination is a matrix obtained from a correlation obtained by measuring outputs of said photodetector for a plurality of illumination lights and display unit-independent coordinate values and a correlation obtained by measuring an output of the photodetector and display unit-independent coordinate values when said display unit outputs black.

14. The computer-readable medium according to claim 9, wherein the display unit-independent coordinate values converted by said conversion processing for the display unit and the display unit-independent coordinate values converted by said conversion processing for illumination are added together.

15. The computer-readable medium according to claim 9, wherein said display unit-independent coordinate values are XYZ.

* * * * *